United States Patent [19]
Rao et al.

[11] Patent Number: 5,666,441
[45] Date of Patent: Sep. 9, 1997

[54] COMPUTER VISION SYSTEM TO DETECT 3-D RECTANGULAR OBJECTS

[75] Inventors: Kashi Rao; Piyush Sarwal, both of Dallas, Tex.

[73] Assignee: Texas Instruments Incorporated, Dallas, Tex.

[21] Appl. No.: 521,512

[22] Filed: Aug. 30, 1995

Related U.S. Application Data

[63] Continuation of Ser. No. 214,930, Mar. 17, 1994, abandoned.

[51] Int. Cl.$^6$ .................................................. G06K 9/46
[52] U.S. Cl. .......................... 382/203; 382/199; 382/286
[58] Field of Search ................................. 382/203, 103, 382/154, 181, 199, 204, 282, 285, 286; 348/143, 152, 154

[56] References Cited

U.S. PATENT DOCUMENTS

| | | | |
|---|---|---|---|
| 4,249,207 | 2/1981 | Harman et al. | 348/152 |
| 5,093,869 | 3/1992 | Alves et al. | 382/22 |
| 5,210,799 | 5/1993 | Rao | 382/22 |
| 5,291,563 | 3/1994 | Maeda | 382/48 |

OTHER PUBLICATIONS

Dhome et al., "Determination of Attitude of 3-D Objects from a Single Perspective View," IEEE Trans. Pattern Anal. Machine Intell., vol. 11, No. 12, pp. 1265-1278, Dec. 1989.

*Primary Examiner*—Leo Boudreau
*Assistant Examiner*—Phuoc Tran
*Attorney, Agent, or Firm*—Ronald O. Neerings; James C. Kesterson; Richard L. Donaldson

[57] ABSTRACT

In general, the invention includes a method and system of rectangular solid detection comprising: receiving an image of data; detecting edges from the image of data; finding lines from the image of data; finding junctions from the lines; filtering junctions and lines that meet a first set of certain criteria; grouping the junctions and lines that meet a second set of certain criteria; and detecting whether a rectangular solid exists in the image according to the grouping. The criteria includes using triplets of lines and fork junctions. The system and method may also analyze a single frame, or a single frame paired with a reference frame.

10 Claims, 8 Drawing Sheets

COMPUTER VISION SYSTEM TO DETECT 3-D RECTANGULAR OBJECTS

This application is a Continuation, of application Ser. No. 08/214,930, filed Mar. 17, 1994, now abandoned.

FIELD OF THE INVENTION

This invention generally relates to computer vision systems, and in particular to detection of three dimensional rectangular solids by computer vision systems.

BACKGROUND

The detection of rectangular 3-D objects in the presence of other structures can have many applications. For example, packing boxes, trailers of tracks and rectangular buildings are a few objects which could be detected with the ability to detach 3-D (three dimensional) rectangular solids. The detection of these objects may be applied in variety of uses, such as: security systems, surveillance systems, targeting systems in weapons, and other military, commercial and consumer products. Detection of rectangular solids can also be used for monitoring tracks in a parking lot or highway, and detecting buildings. Consequently, the detection of rectangular solids can be very beneficial in a variety of fields.

In regards to detecting buildings, a system may find roof tops (mostly piece-wise rectangular roof tops) using edge contours and line segments of vertical views of buildings (R. Mohan and R. Nevatia. Using perceptual organization to extract 3-D structures. *IEEE Transactions on Pattern Analysis and Machine Intelligence,* 11 (11): 1121–1139, November 1989.). Another system uses both an edge and a region finder; they use shadows to confirm evidence of a building (Y-T Liow and T. Pavlidis. Use of shadows for extracting buildings in aerial images. *Computer Vision, Graphics, and Image Processing,* 49: 242–277, 1990.). Another system has been developed to find piece-wise rectangular roofs in aerial images (P. Fua and A. J. Hanson. Objective functions for feature discrimination theory. In *Proceedings of the DARPA Image Understanding Workshop,* pages 443–460, Palo Alto, Calif., May 1989. Morgan Kaufmann Publishers.).

A non-stereo approach for building detection has also been developed (V. Venkateswar and R. Chellappa. A framework for interpretation of aerial images. In *Proceedings, International Conference on Pattern Recognition,* Volume 1, pages 204–206, Atlantic City, N.J., June 1990.; V. Venkateswar and R. Chellappa. A hierarchical approach to detection of buildings in aerial images. Technical Report CAR-TR-567, Center For Automation Research, University of Maryland, August 1991.). This approach is based on the correspondence between the building of interest and its shadow. The shadow, along with the position of the sun, is used to estimate the dimensions of the building. This approach is also based on edge contours (V. Venkateswar and R. Chellappa. A hierarchical approach to detection of buildings in aerial images. Technical Report CAR-TR-567, Center For Automation Research, University of Maryland, August 1991.). Other related systems have also been developed (Z. Aviad and D. M. McKeown, Jr. The generation of building hypothesis from monocular views. Technical Report CMU-TR-, Carnegie-Mellon University, 1991.; E. L. Walker, M. Hera, and T. Kanade. A framework for representing and reasoning about three-dimensional objects for vision. *AI Magazine,* 9(2): 47–58, Summer 1988.; M. Herman and T. Kanade. Incremental reconstruction of 3-D scenes from multiple, complex images. *Artificial Intelligence,* 30: 289–341, 1986.).

An alternative approach could be to use template matching to detect boxes (J. Ooi and K. Rao. New insights into correlation-based template matching. In *SPIE Conference on Applications of Artificial Intelligence IX, OE/Aerospace Sensing Symposium,* Orlando, Fla., April 1991.; A. Margalit and A. Rosenfeld. Using probabilistic domain knowledge to reduce the expected computational cost of template matching. *Computer Vision, Graphics, and Image Processing,* 51(3): 219–234, September 1990.; X. Li, M. Ferdousi, M. Chen, and T. T. Nguyen. Image matching with multiple templates. In *Proceedings of Computer Vision and Pattern Recognition Conference,* pages 610–613, Miami Beach, Fla., June 1986.; A. Goshtasby, S. H. Gage, and J. F. Bartholic. A two-stage cross correlation approach to template matching. *IEEE Transactions on Pattern Analysis and Machine Intelligence,* 6(3) 374–378, May 1984.; S. L. Tanimoto. Template matching in pyramids. *Computer Graphics and Image Processing,* 16: 356–369, 1981.). These techniques, however, rely on a priori knowledge of the specific object and viewing conditions. In general these methods are suitable for simple images in which the object size and image intensity stay almost constant. For these techniques to be successful for rectangular solid detection, the system will require a very large number of templates to capture different orientations, image size and image intensity. Even with such a large number of templates these techniques will be restricted to a particular kind of box.

In related work, others have used line labeling and segmentation of scenes with polyhedral objects (A. Guzman. Decomposition of a visual scene into three-dimensional bodies. In *AFIPS Proceedings Fall Joint Comp. Conf.,* volume 33, 1968.). This method, however, assumes that perfect edges from the object are formed. In this method, the edges and the junctions are used to trace the full contour of the rectangular object This technique performs satisfactorily only if a full view of the object is available. Other related work exists in the blocks world research (G. Falk. Interpretation of imperfect line data as a three-dimensional scene. *Artificial Intelligence,* 3: 101–144, 1972; Y. Shirai. *Analyzing Intensity Arrays Using Knowledge About Scenes,* chapter 3. McGraw-Hill Book Co., New York, 1972. Editor, P. H. Winston; D. L. Waltz. *Generating Semantic descriptions from drawings of scenes with shadows,* chapter 2. McGraw-Hill Book Co., New York, 1972. Editor, P. H. Winston; D. A. Huffman. *Impossible Objects as Nonsense Sentences,* volume 6, pages 295–323. Edinburgh University Press, Edinburgh, 1971. Edited by B. Meltzer and D. Michie; M. Clowes. On seeing things. *Artificial Intelligence,* 2(1): 79–116, 1971.).

SUMMARY OF THE INVENTION

Accordingly, improvements which overcome any or all of the above-cited problems in detecting rectangular solids are presently desirable. It is also herein recognized that a need exists for a computer vision system which has the ability to detect 3-D rectangular solids without requiting perfect edges. It is also desirable for the system to perform well even under some occlusion. The present invention is directed towards meeting those needs.

The invention includes a system to detect 3-D rectangular objects. The invention also includes a method to detect rectangular solids in real images in arbitrary orientations, positions, distances from the camera and lighting. This method works by detecting junctions and adjacent edges of rectangular solids. A rough reference image of the background can also be used, if available. The invention has worked successfully on several hundreds of real images. In particular, the system performance was evaluated by plotting receiver operating characteristic curves (probability of detection versus probability of false alarm). These curves were plotted for results on 500 images acquired in a scene with rich background structure (the scene had a large number of background lines and rectangles). In such an environment, the system achieved 93% detection at a 13% false alarm rate.

To sum, a system has been developed utilizing fork junctions (typical fork junctions are shown in FIGS. 5(a) and 5(b)) as a detection device for rectangular solids. The fork junctions are then utilized as a projection of a vertex of a rectangular solid. Consequently, criteria have been developed for using groupings of possible fork junctions and rectangular triplets (a set of three connecting lines) to form rectangular solid hypotheses. In addition, a useful method of edge magnitude differencing has been developed to get a robust separation of background from an object of interest. This is especially adaptable to lighting changes where a reference image for the background is available.

Another advantage of the invention is the ability to use imperfect data from real images and still detect rectangular solids with a high success rate. The invention also includes a general purpose technique for the detection of 3-D rectangular objects without any assumption on the specific size of the object.

Yet another advantage of the invention, is the ability to utilize either a single frame as input, as well as frames accompanied by reference frames. The addition of reference frames assists the system in detecting rectangular solids in motion.

In general, the invention can include a method and system of rectangular solid detection comprising: receiving an image of data; detecting edges from the image of data; finding lines from the image of data; finding junctions from the lines; filtering junctions and lines that meet a first set of certain criteria; grouping the junctions and lines that meet a second set of certain criteria; and detecting whether a rectangular solid exists in the image according to the grouping.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The foregoing and further aspects of the invention are illustrated in the accompanying drawings wherein like elements are denoted by like reference designators and in which.

DETAILED DESCRIPTION OF THE PREFERRED EMBODIMENT

Figures 1, 4, 5, 7A, 7B, 7C, 8A, 8B, 8C, 9, 10, 11A, 11B:
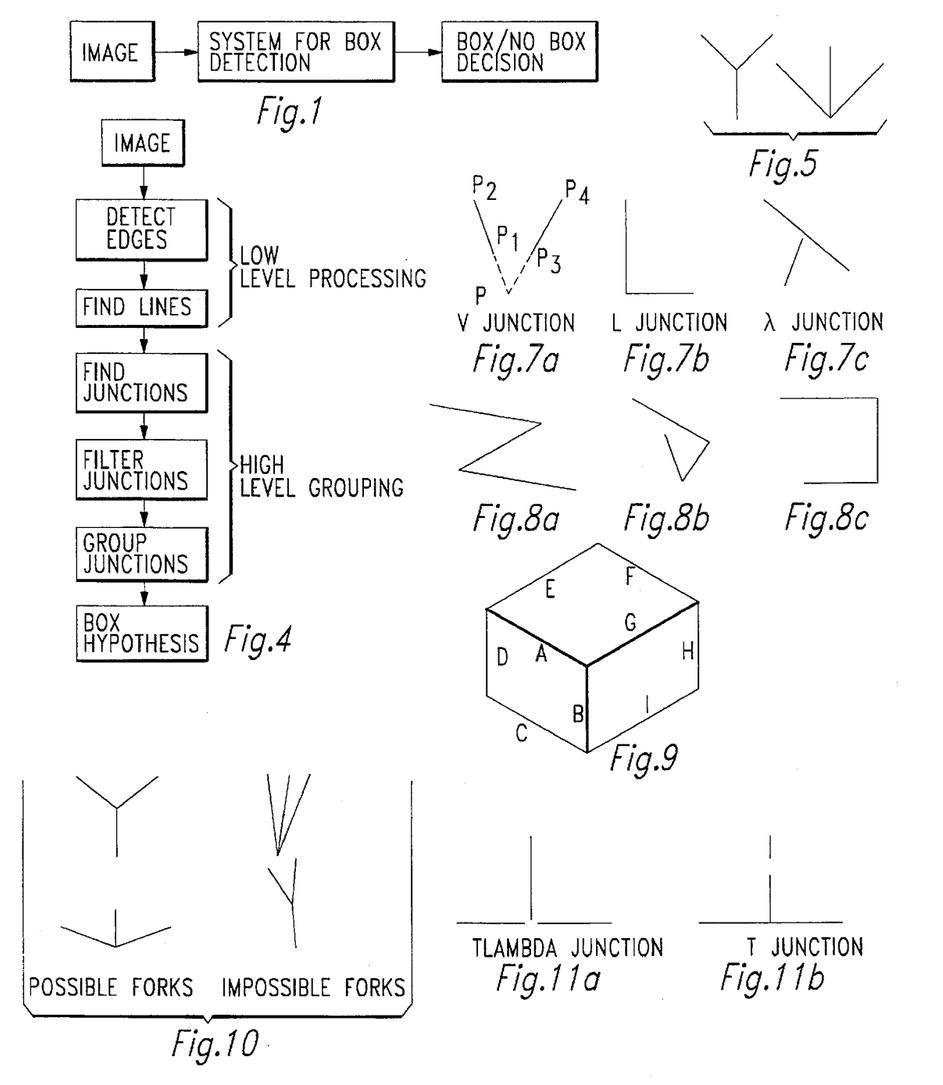
FIG. 1 is a block diagram of preferred embodiment.
FIG. 4 is a flow diagram of the preferred embodiment.
FIG. 5 depicts a typical Y shaped fork junction and a typical arrow shaped fork junction.
FIG. 7(a) depicts an example of a V junction.
FIG. 7(b) depicts another example of a V junction.
FIG. 7(c) depicts another example of a V junction.
FIG. 8(a) depicts an example of a triplet.
FIG. 8(b) depicts another example of a triplet.
FIG. 8(c) depicts another example of a triplet.
FIG. 9 is an orthogonal view of a box.
FIG. 10 depicts examples of possible junctions and examples of impossible junctions.
FIG. 11(a) depicts an example of a Tlambda junction.
FIG. 11(b) depicts an example of a T junction.

FIG. 1 depicts a flow diagram for the preferred embodiment.

Figure 2:
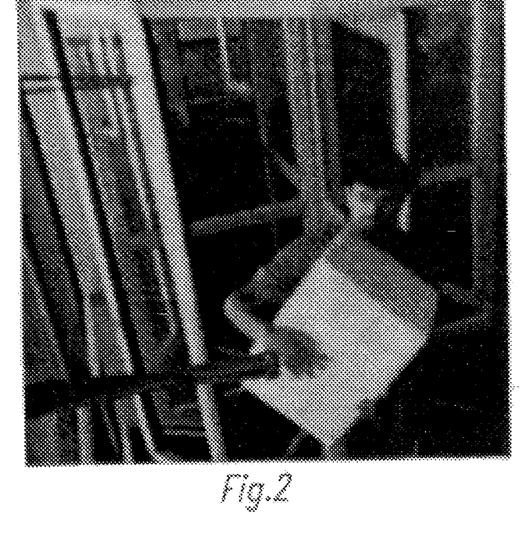
FIG. 2 is an image of a man carrying a box coming out of a revolving door.

In FIG. 2, a frame is being analyzed for a carded box. Notice, that the background information is cluttered and could be easily confused with rectangular solids by other systems.

Figure 3:
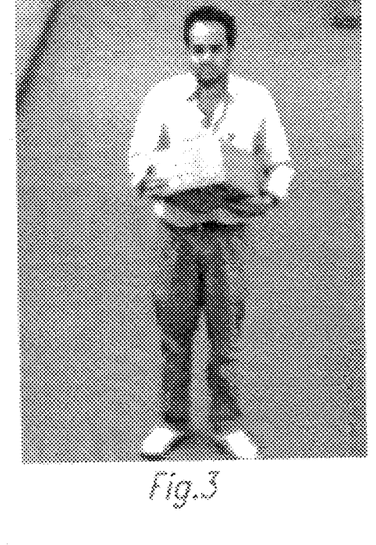
FIG. 3 is an image of a man carrying a box with low background clutter.

In FIG. 3, a man carrying a box is depicted in an image with low background clutter.

FIG. 4 shows a block diagram for the detection system. The system first detects edges, next finds lines, and then finds junctions. It then filters the junctions based on angles, and groups junctions to form box hypotheses.

In contrast to most of the other approaches, the preferred embodiment is based on fork junctions and triplets. Typical fork junctions are shown in FIGS. 5(a) and 5(b). The figures show the two possible fork junctions. FIG. 5(a) shows a junction resembling a Y and FIG. 5(b) shows a junction resembling an arrow. These junctions have also been collectively referred to as Y junctions. The fork junctions are typical to 3-D objects and capture all three dimensions. In addition, this information can be utilized to estimate the dimensions of the 3-D objects. In addition to the fork junction, the preferred embodiment uses triplets extensively. The triplets are somewhat similar to U structures used in R. Mohan and R. Nevatia, Using perceptual organization to extract 3-d structures, *IEEE Transactions on Pattern Analysis and Machine Intelligence*, 11(11): 1121–1139, November 1989. These triplets will be discussed in greater detail later. In sum, the detection of a rectangular solid is based on either matching forks, triplets or a matching fork and triplet.

Low Level Processing

The system of the preferred embodiment detects rectangular objects from two different kinds of situations. The first situation is the case where only a single image frame is available for each detection, whereas in the second case a reference frame is also available. The second situation is important where motion information is available and an example of such instance is the case where a rectangular object, such as a box, is being carried. An ideal reference frame is an image of the scene being analyzed with no relative motion. As will be evident later, all the frames in the sequence are analyzed separately. The information on motion can be used to estimate and update the reference frame. However, the motion information is not required if the reference frame can be chosen without it.

The preferred embodiment will be discussed in reference to detecting a box, similar to the image depicted in FIG. 2. For the purposes of the preferred embodiment, it is assumed that the view of the frame, and therefore the camera, remains fixed at all times. Since the reference frame will be differenced with the image to be analyzed for a carded box, it is desirable that the time period of the reference frame be close to that of the current image being processed. This is necessary because lighting may change with time and the difference in gray values between relative pixels of the two images becomes significant. This will be particularly true if the image is an outdoor scene.

Figure 6:
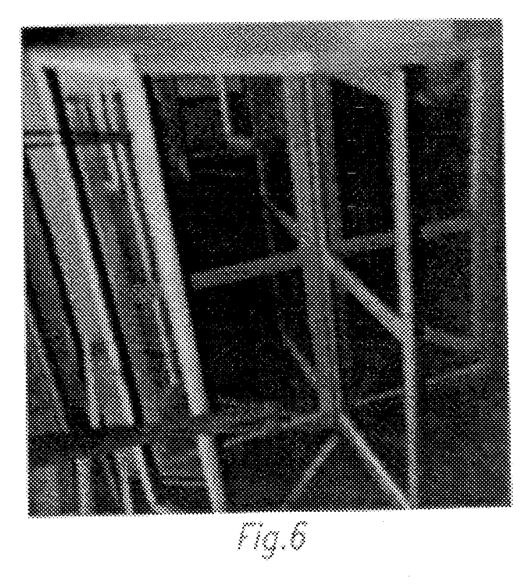
FIG. 6 is a reference image for FIG. 2.

FIG. 2's corresponding reference frame is shown in FIG. 6. As is evident from the figure, a simple difference between two images, assuming ideal conditions and perfect lighting, will get rid of the stationary parts of the image. This technique, however, has two problems. The difference operation will change the gray values in the region of interest (human being and the carried box). This change in pixel values in the area of interest may not be linear or symmetric and is a function of the texture of the background. Secondly, ideal conditions may never exist and the gray values will change from frame to frame, even with constant lighting.

To overcome these problems, a modified difference method is used where the pixel value of the resultant image is zero. The resultant value is zero for a particular pixel, if the difference between the gray values for the reference frame and image being processed is less than some threshold, T. Alternatively, if the difference is greater than T, the resultant pixel value equals the grey level of the corresponding pixel of the image being analyzed. Assuming that the box is of a different material than the stationary objects, this modified difference will help retain the region of interest and will not be affected by small changes in pixel values. This assumption works extremely well in the preferred embodiment where the boxes are made of cardboard and the background consists of concrete and glass. However, the invention is not limited to the preferred embodiment.

As noted before, scene lighting may change either suddenly or during some time interval. Also, updating the reference frame may not be possible for long periods of time because of continuous motion. Therefore, changes in edges should be adaptable to lighting changes. Consequently, edge differencing should be utilized to facilitate the changes. Specifically, the modified difference technique should be used. In addition, it is important to use the edge magnitude image rather than the thresholded edge image, to avoid breaking edges in the areas of interest.

However, these edges may not be very robust and may tend to shift by a pixel or two. This is especially true where the background objects are not stationary (e.g., as the revolving door in the preferred embodiment—which may not always stop exactly at the same place). Even if the surrounding objects were perfectly stationary, change in lighting can cause the edges to move slightly. To compensate, the single pixel edges are thickened to three pixels. These thickened edges act as a mask for the edges from the image of interest. Since the difference is calculated using the modified difference, a thick image does not effect the image of interest.

The edge difference technique does not require the reference frame to be updated continuously. For example, a single reference frame is used for all simulations in the preferred embodiment. In addition, the edge difference technique will work equally well if the change in lighting is not significant. The main disadvantage of edge differencing technique is that it is computationally expensive and sometimes represents 50% of the simulation time. However, the edges of the difference frame will be computed only if the reference frame has been updated. Furthermore, the edges of the image being analyzed are needed for line and junction finding.

For the case when no motion information or reference image information is assumed, the edge image is obtained directly using the edge operator on the available gray level image. Although any edge detector may be used, the preferred embodiment utilizes the Canny edge detector (J. Canny. A computational approach to edge detection. *IEEE Transactions on Pattern Analysis and Machine Intelligence,* PAMI-8(6): 679–698, November 1986.). The Canny edge detector's output is an image consisting of single pixel thick edges. As a final step of difference calculation, the resultant difference image is thresholded and serves as the input for the line finding technique.

The preferred embodiment employs line finding and junction finding techniques as discussed in A. Etemadi, J-P. Schmidt, G. Matas, J. Illingworth, and J. Kittier, Low-level grouping of straight line segments, Technical report, University of Surrey, August 1992. In addition, the preferred embodiment utilizes this technique with computer software called ORT. This software takes the edge image as input and converts the edge data to straight lines and circular arcs. However, the circular arcs are rejected since only straight lines are of interest. Next, V junctions are formed. Examples of V junctions are shown in FIGS. 7(a), 7(b) and 7(c). A V junction, shown in FIG. 7(a), is formed by a pair of intersecting lines whose intersecting point does not lie on the either of the two lines. A special case of these V junctions is the L junction, shown in FIG. 7(b), where the intersecting angle is 90°. If the junction point of the two lines lies on one of the lines, then the junction is called a lambda junction. An example of a lambda junction is shown in FIG. 7(c). In addition, V and L junctions form the basis for constructing higher level junctions.

For each V junction, a corresponding quality factor, Q, is also calculated. With reference to FIG. 7(a)'s quality, Q, is defined as:

$$Q = \frac{\|p_2 - p_1\| \|p_4 - p_3\|}{\|p_2 - p\| \|p_4 - p\|} \quad (1)$$

Here $p_1, p_2, p_3, p_4$, and p are point vectors (vectors from the origin to the points); and $\|\ \|$ represents the $L_2$ norm. A Quality of 1 represents the case where the intersection point is on the vertex of both the lines. For example, FIG. 7(b) for the L junction would have a quality of 1. A quality of more than 1 means that the intersection point lies on one of the lines. Therefore, the junction is not a V junction, but a lambda junction. For the purposes of the preferred embodiment, only L and V junctions are considered.

Note, by varying the value of Q, the number of junctions which will be formed will also be varied. Similarly, as the value of Q is decreased, the number of junctions formed will increase. For the preferred embodiment, a quality of 0.7 or more is used.

High Level Grouping

The preferred embodiment uses fork junctions and triplets to detect 3-D rectangular objects. FIGS. 8(a), 8(b) and 8(c) show typical triplets which consist of three lines and two V junctions. Specifically, a triplet is formed by two V junctions which share a single line. Two typical fork junctions are show in FIGS. 5(a) and 5(b). Both fork junctions and triplets consist of three lines. However, in the case of the fork junction, all lines form V junctions with each other, whereas in the case of the triplet, there is one pair of lines which does not form a V junction.

FIG. 9 shows a 3-D rectangular object. The object is shown as a combination of lines. The nine visible lines are marked A through I. For an example of a triplet, consider lines C, D and A. Since these lines correspond to the edges of a rectangular object, and the projection is orthographic, lines C and A are parallel to each other. Lines C and A are called the outer limbs of the triplet, and line D is called the center limb. In addition, because lines C and A are on the same side of the center limb, the lines overlap each other.

The above described information is used to filter the triplets. Of all the triplets possible, only the triplets with outer limbs parallel and overlapping are accepted, and all other triplets are rejected. For example, referring to FIG. 9, the triplet formed by lines A, C and D will be accepted, but the triplet formed by lines A, B and I will be rejected. The latter kind of triplet is not considered because it is not specific to rectangular objects and can also be formed by other objects.

In addition to the fork junctions formed by rectangular objects, fork junctions can also be formed by non-rectangular 3-D objects. Since only rectangular objects are of interest, some constraints can be placed on the angles formed between the fork junctions. In turn, these constraints can filter out the unwanted fork junctions.

Figure 26:
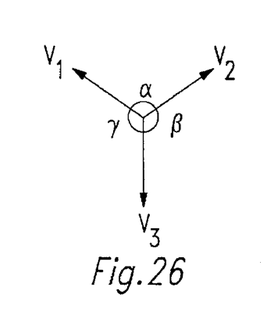
FIG. 26 is a graph of a set of axis for use in setting up the geometry to determine possible and impossible angles.

Let $\alpha$, $\beta$ and $\gamma$ be the three angles of the fork junction as shown in FIG. 26. If the fork junction is an orthographic projection of a vertex of a rectangular 3-D object, no angle can be greater than 270°. FIGS. 10(a) and 10(b) show both possible and impossible fork junctions. Another impossible scenario is where two angles are greater than 90° and one angle is less than 90°. The proof for these angle constraints is given below.

Let $\vec{v}_1$, $\vec{v}_2$ and $\vec{v}_3$ be the unit vectors in the image plane as shown in FIG. 26. (Related work is in J. Malik. 1993. Personal Communication; and in K. Kanatani. Constraints on length and angle. *Computer Vision, Graphics, and Image Processing*, 41: 28–42, 1988.) From the image it follows that $\vec{v}_1 \cdot \vec{v}_2 = \cos(\alpha)$, $\vec{v}_2 \cdot \vec{v}_3 = \cos(\beta)$ $\vec{v}_3 \cdot \vec{v}_1$ and $= \cos (\gamma)$. Let $\vec{v}_1$, $\vec{v}_2$ and $\vec{v}_3$ be the (orthographic) projections of 3 mutually orthogonal vectors $\vec{\mu}_1$, $\vec{\mu}_2$ and $\vec{\mu}_3$ in 3-D. (Assume orthographic projections, unless otherwise stated.) Assume that the world coordinates have been transformed such that the three world vectors can be expressed as follows:

$$\vec{\mu}_1 = \vec{v}_1 + \mu_{1_x}\vec{k} \tag{2}$$

$$\vec{\mu}_2 = \vec{v}_2 + \mu_{2_x}\vec{k} \tag{3}$$

$$\vec{\mu}_3 = \vec{v}_3 + \mu_{3_x}\vec{k} \tag{4}$$

It can be shown that the above vectors can be obtained without any loss of generality. Since $\vec{\mu}_1$, $\vec{\mu}_2$ and $\vec{\mu}_3$ are orthogonal it follows that:

$$\vec{\mu}_1 \cdot \vec{\mu}_2 = \vec{\mu}_2 \cdot \vec{\mu}_3 = \vec{\mu}_3 \cdot \vec{\mu}_1 = 0 \tag{5}$$

From equations (2) and (5) it follows that:

$$\vec{\mu}_1 \cdot \vec{\mu}_2 = \vec{v}_1 \cdot \vec{v}_2 + \mu_{1_x}\mu_{2_x} \tag{6}$$
$$= \cos(\alpha) + \mu_{1_x}\mu_{2_x}$$
$$= 0$$

Equation (6) implies that:

$$\mu_{1_x}\mu_{2_x} = -\cos(\alpha) \tag{7}$$

Similarly it can be shown that:

$$\mu_{2_x}\mu_{3_x} = -\cos(\beta) \tag{8}$$

and $$\mu_{3_x}\mu_{1_x} = -\cos(\gamma) \tag{9}$$

From equations (7), (8) and (9), it follows that:

$$\cos(\alpha)\cos(\beta)\cos(\gamma) = -\mu_{1_x}^2\mu_{2_x}^2\mu_{3_x}^2 \tag{10}$$

or $$\mu_{1_x}\mu_{2_x}\mu_{3_x} = \sqrt{-\cos(\alpha)\cos(\beta)\cos(\gamma)} \tag{11}$$

Since the left hand side quantity in the above equation is real, it follows that $\cos(\alpha)$ $\cos(\beta)$ $\cos(\gamma)$ should be negative. (Also, note $\alpha+\beta+\gamma=360°$.) Table 1 summarizes the results by indicating possible and impossible values for $\alpha$, $\beta$, and $\gamma$, and their cosines (constraints on cosines are shown in parentheses).

TABLE 1

Possible and impossible values of angles, and cosines of angles in parentheses, in a 2-D projection of a 3-D orthogonal trihedral vertex.

| Possible | Not Possible |
| --- | --- |
| 2 angles acute, 1 angle obtuse (1 negative cosine, 2 positive cosines) | 1 angle > 270°, 2 angles acute (all positive cosines) |
| all 3 angles obtuse (all 3 cosines negative) | 2 angles obtuse, 1 angle acute (2 negative cosines, 1 positive cosine) |

In summary, during fork filtering, all the fork junctions which satisfy either: 1) 2 angles acute, 1 angle obtuse, or 2) where all three angles are obtuse are accepted. The other fork junctions are rejected.

In addition to the fork junctions obtained after filtering, Tlambda junctions are also used. These junctions are actually a special case of fork junctions in which the three lines are at 90°, 90°, and 180°, respectively. A Tlambda junction is shown in FIG. 11(a). This junction is different from a T-junction, which is formed by only two line segments. FIG. 11(b) shows an example of a T-junction. All Tlambda junctions are retained for the box detection process, and will be treated as a special case of fork junctions.

However, the presence of a filtered fork junction, a Tlambda junction and a triplet is not sufficient enough for the detection a rectangular object. This is because these junctions may be formed accidently by the surrounding objects or by a rectangular junction of a non-rectangular solid. To develop another condition for detection of the rectangular objects, FIG. 9 is considered again.

In FIG. 9, lines A, B and C represent a triplet, and lines A, G and B form a fork junction. The triplet and fork formed by these 4 lines share two lines. Since only those triplets whose outside limbs are parallel and overlapping are accepted, a necessary condition for the rectangular object to exist is that a triplet and fork share two lines. If the lines are perfect, e.g., represent the whole object, and the camera calibration is known, the four lines forming the fork and triplet can also be used to determine the dimension of the rectangular object.

In many cases, however, only one face of the box is visible to the camera. In this case, no fork junction will be formed. Therefore, as a second condition, two matching triplets are sought. Two triplets are said to match, if they share two out of three limbs. If the shared limbs are the two outer limbs in both the triplets, then the center limbs of both the triplets must be at least at a distance of the maximum of the length of the two limbs.

As a third matching feature, two matching fork junctions are sought. For two fork junctions to match, the two fork junctions must have one edge in common. Of the two fork junctions, one must be of the shape of Y and other must be the shape of an arrow. In addition, the matching edge must be the center limb. Further, the respective outer limbs must be parallel to each other. As an example, in FIG. 9, consider fork junctions formed by lines ABG and CBI. ABG is a fork shaped like a Y, while CBI is a fork junction shaped as an arrow. Additionally, both of the junctions share the center edge, B. Also, lines A and C are parallel, and lines G and I are parallel.

In the above conditions, one may replace a fork junction with a Tlambda junction, since Tlambda junctions, are a special case of fork junctions. Of the conditions discussed above, the matching fork junction and triplet is the strongest condition, since for this condition to be satisfied the fork and triplet have to belong to a rectangular object. Another strong condition is when two matching forks are found. However, the matching triplets condition is not as strong because it can be formed by flat (2-D) objects, as well as 3-D rectangular solids.

Figure 12:
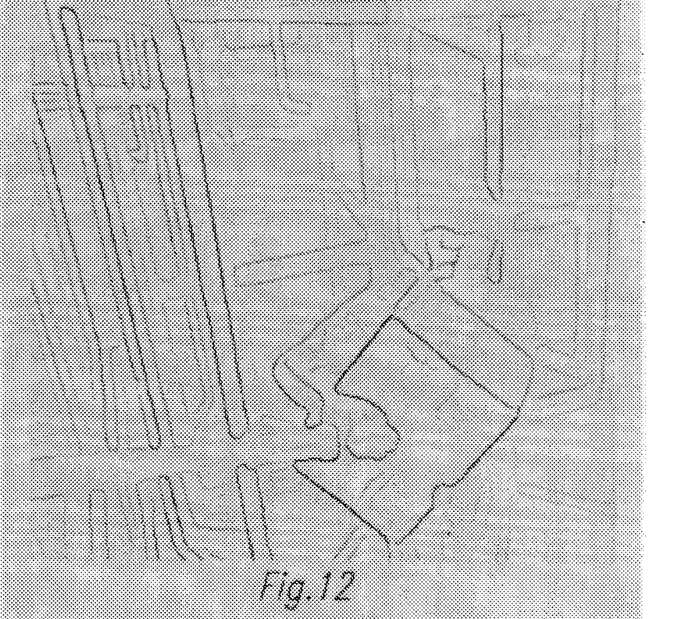
FIG. 12 is an edge image of FIG. 2.
Figure 13:
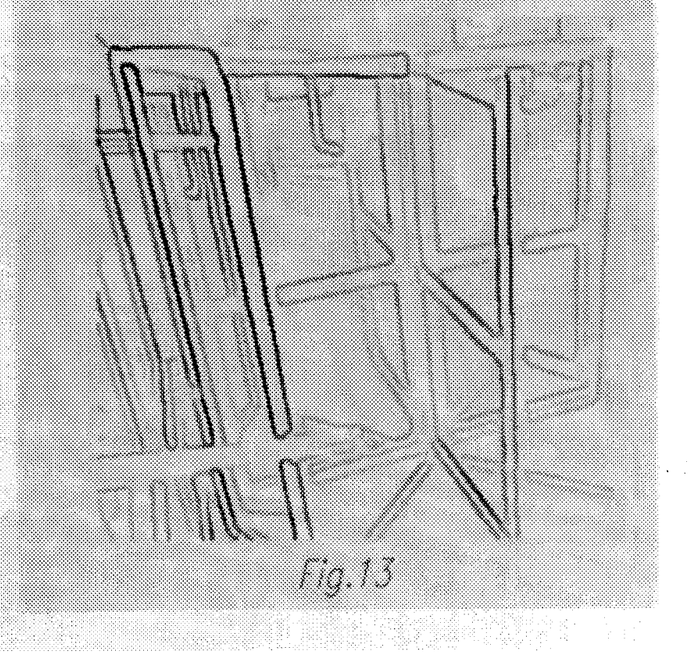
FIG. 13 is an edge image of FIG. 6.
Figure 14:
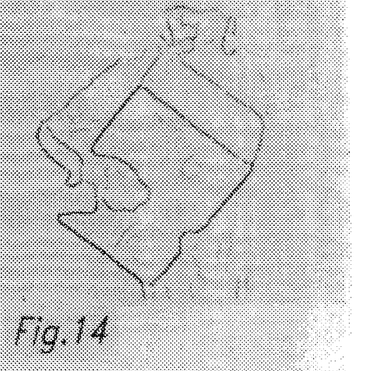
FIG. 14 is a difference image composed from FIGS. 12 and 13.
Figure 15:
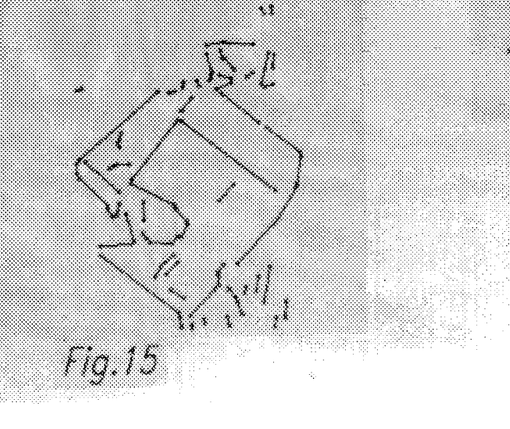
FIG. 15 is line image of FIG. 2.
Figure 16:
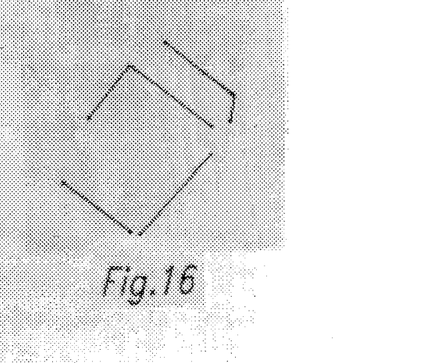
FIG. 16 is a detected box.
Figure 17:
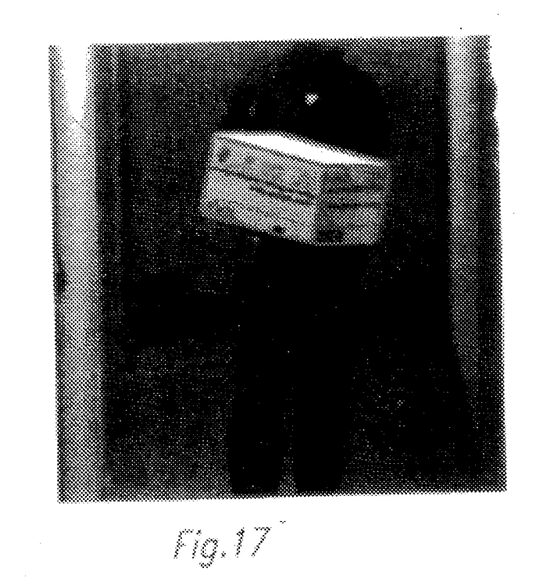
FIG. 17 is an image from an example result.
Figure 18:
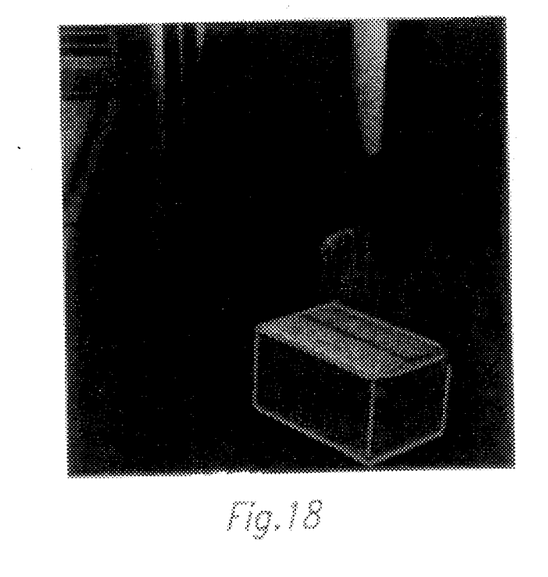
FIG. 18 is an image from another example result.
Figure 19:
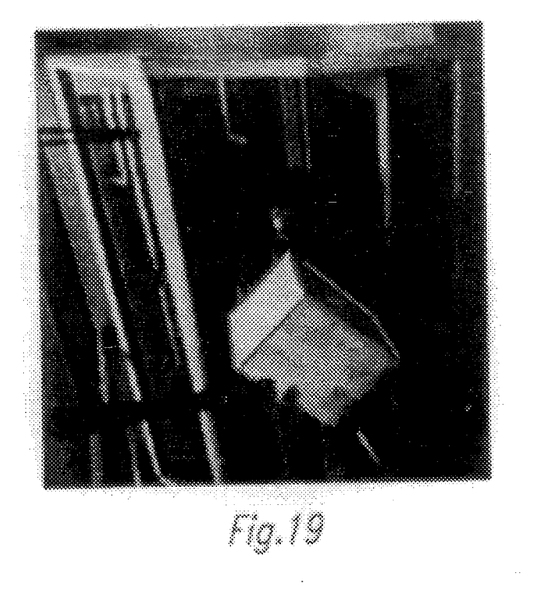
FIG. 19 is an image from another example result.
Figure 20:
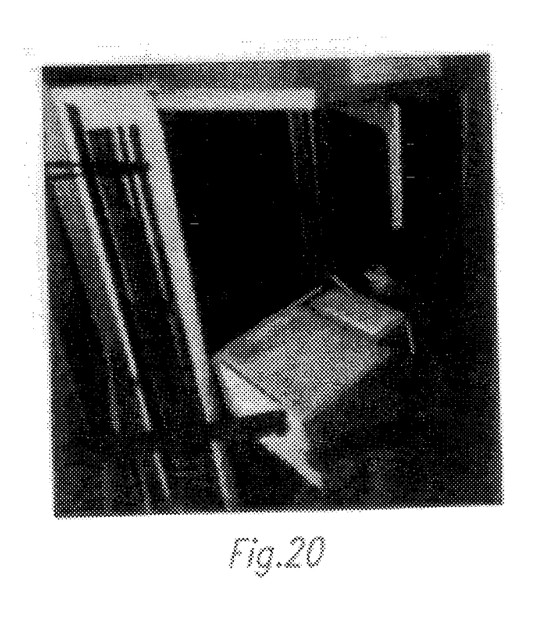
FIG. 20 is an image from yet another example result.

To illustrate the above system, reconsider FIG. 2, an image being analyzed for the presence of a box. FIG. 12 and 13 show the edge maps of images of FIGS. 2 and 6 respectively (FIG. 2 is the image being analyzed and FIG. 6 is the reference image). The edge maps of the image of FIG. 12 shows many edges from the surroundings which have a potential of being classified as boxes. In addition to the potential for false alarms, these extra lines also increase computation time. The two images from FIGS. 2 and 6 are differenced as discussed before using the edge maps shown in FIGS. 12 and 13. The difference image is shown in FIG. 14. As FIG. 14 suggests, many lines corresponding to the surroundings have been eliminated by the differencing technique. The differenced image in FIG. 14 is then analyzed to find lines. The resultant image is shown in FIG. 15. The image of FIG. 15 is then used as an input to find junctions. The analysis then results in a detected box as shown in FIG. 16.

The preferred embodiment was implemented in C on a SUN SparcStation 2 running Unix. The entire processing, from image acquisition to the result of box detection takes about 20 seconds per image frame. The code could easily run at a frame a second; or even real time (several frames a second) on image processing hardware (such as the Datacube MaxVideo 20 image processing system). The specifications of computer software and computer hardware is used as example only. The invention could easily be adapted to any computer software and computer hardware that can implement the invention.

Results and Performance Evaluation

To evaluate the system in greater depth, the following experiment was conducted. 500 images of people walking through two different revolving doors of one building were collected. An example of such an image is shown in FIG. 2. Of the 500 images, about 200 had people with no boxes while the other images had people carrying boxes. These images represent different carried boxes at different times of the day; whereas different times of the day cause different lighting conditions.

A few results from the experiment are shown in FIGS. 17, 18, 19 and 20. All four of these figures show the detected box overlaid on the original image. Of the four figures, the first two figures have no occlusion, whereas the third image has some occlusion due to the hand and the surrounding structures. The fourth figure represents the case when 2 boxes are present. Nevertheless, the system was able to detect both the boxes.

The 500 images in the experiment correspond to 125 sequences, each sequence consisting of four images. For the purpose of plotting characteristic curves, a rectangular box is said to have been detected if it was found in any one of the 4 images in a sequence. For each image, the algorithm was run with 5 different values of quality (quality was defined previously.) The different values of quality used were 0.90, 0.85, 0.80, 0.75 and 0.70. The different values allow plotting the receiver operating characteristic (ROC) curve. The final decision of the algorithm was recorded for each case. Depending on the final decision and the input image, four different events are possible. The first case represents the scenario when there is a box in the image, and a box is detected; this is considered a detection. The second case is when the box in the image is not detected; this event is called a miss. The third case is when there is no box in the image and a box is detected; this is termed a false alarm. The final case is the scenario when there is no box in the image and no box is detected.

The probability of detection, $P_D$, is defined as:

$$P_D = \frac{\text{Total number of detections in image with box}}{\text{Total number of images with box}} \quad (12)$$

The probability of false alarm, $P_F$, is defined as:

$$P_F = \frac{\text{Total number of detections in images with no box}}{\text{Total number of images with no box}} \quad (13)$$

$P_D$ and $P_F$ are calculated for each value of quality. These two probabilities are used to plot the receiver operating characteristic (ROC) curves (H. L. Van Trees. *Detection, Estimation and Modulation Theory*. John-Wiley, New York, 1982.).

In addition, ROC curves are also plotted when the image is defocussed. The defocussing experiment was conducted to illustrate the situation when the acquired image may be out of focus due to inaccurate focussing or due to objects moving very fast in the field of view.

Figure 21:
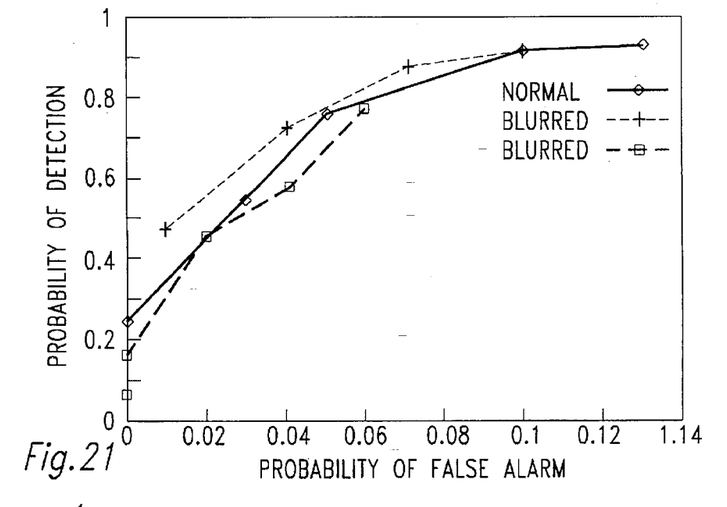
FIG. 21 is an ROC curve for the box detection experiment.
Figure 22:
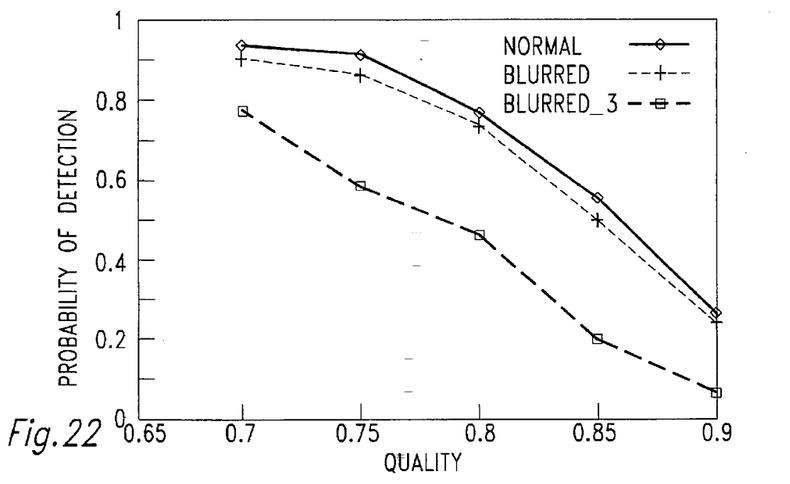
FIG. 22 is a plot of probability of detection versus quality.
Figure 23:
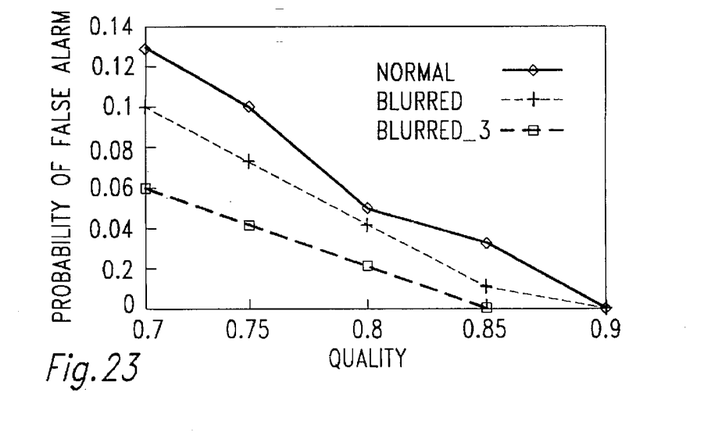
FIG. 23 is a plot of probability of false alarm versus quality.

To simulate defocussing or image acquisition at lower resolution, the original images were smoothed with a Gaussian mask of different variances. For each Gaussian mask, a different ROC curve was plotted. FIG. 21 shows the different curves. Besides ROCs, $P_D$ and $P_F$ against quality was also plotted. These plots are shown in FIGS. 22 and 23 respectively. In these figures, "blurred" corresponds to a Gaussian smoothing with a variance of 1, and "blurred_3" corresponds to a Gaussian smoothing with a variance of 12.78. These variances correspond to levels of smoothing of 1 and 3 in a utility program used for the experiment. However, any utility program that allows Gaussian smoothing of images could be used.

The following points are summarized from the plots: 1) when the probability of detection increases, so does the probability of false alarm—FIG. 21; 2) as the quality increases, the probability of detection decreases—FIG. 22; 3) as the quality increases, the probability of false alarm also decreases—FIG. 23; and 4) as the image gets more defocussed, both the probabilities of detection and false alarm decrease for a given quality. This was expected, because, as the image is defocussed, fewer lines are formed and groupings for a box are less likely.

Figure 24:
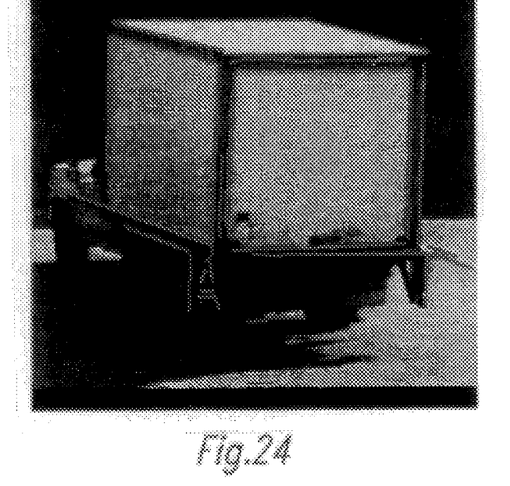
FIG. 24 is an image for a detected track.
Figure 25:
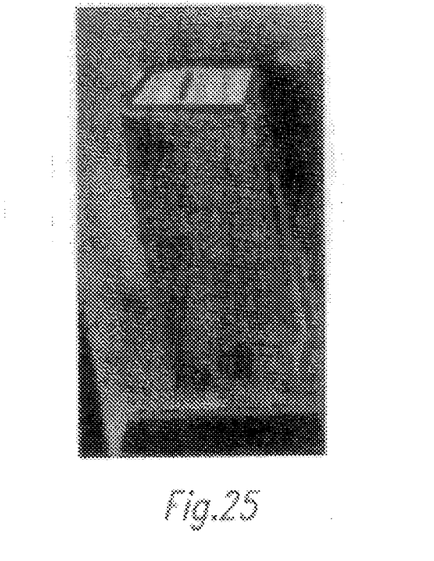
FIG. 25 is an image from a detected building.

In addition to detecting packing boxes, the system may be used to detect trucks and buildings. FIG. 24 shows the result of truck detection; and FIG. 25 shows the result of building detection.

A few preferred embodiments have been described in detail hereinabove. It is to be understood that the scope of the invention also comprehends embodiments different from those described, yet within the scope of the claims. Words of inclusion are to be interpreted as non-exhaustive in considering the scope of the invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of rectangular solid detection comprising:
   receiving a reference image of a scene;
   receiving a new image of said scene;
   differencing said new image of said scene from said reference image of said scene to produce a differenced image of said scene with a modified differencing technique; and
   identifying a rectangular solid from said differenced image of said scene wherein said identifying said rectangular solid includes:
      detecting edges from said differenced image of said scene;
      finding lines from said edges and said differenced image of said scene;
      finding fork junctions from lines and said differenced image of said scene;
      filtering fork junctions and triplets of lines that meet a first set of certain criteria;
      grouping said junctions and said triplets of lines that meet a second set of certain criteria; and
      determining whether a rectangular solid exists in said image according to said grouping.

2. The method of claim 1, wherein said finding fork junctions utilizes a quality factor, wherein said quality factor relates to a position of an intersecting point of two lines of said fork junction.

3. The method of claim 1, wherein said first set of certain criteria includes:
   accepting said triplets of lines with outer lines parallel and overlapping;
   rejecting said fork junctions with angles greater 270°;
   rejecting said fork junctions with two obtuse angles and one angle acute; and accepting all remaining fork junctions.

4. The method of claim 1, wherein said second set of certain criteria includes:
   grouping said fork junctions and said triplets of lines that share two lines;
   grouping said triplets of lines that share two lines; and
   grouping said fork junctions that share one line.

5. A method of rectangular solid detection comprising:
   receiving an image of a scene;
   detecting edges from said image of said scene;
   finding lines from said edges and said image of said scene;
   finding triplets of lines from said lines and said image of said scene;
   finding fork junctions from said lines;
   filtering fork junctions and triplets of lines that meet a first set of certain criteria;
   grouping said fork junctions and triplets of lines that meet a second set of certain criteria; and
   determining whether a rectangular solid exists in said image according to said grouping.

6. The method of claim 5, wherein said first set of certain criteria includes:
   accepting said triplets of lines with outer lines parallel and overlapping;
   rejecting said fork junctions with angles greater 270°;
   rejecting said fork junctions with two obtuse angles and one angle acute; and
   accepting all remaining fork junctions.

7. The method of claim 5, wherein said finding fork junctions utilizes a quality factor, wherein said quality factor relates to a position of an intersecting point of two lines of said fork junction.

8. The method of claim 5, wherein said second set of certain criteria includes
   grouping said fork junctions and said triplets of lines that share two lines;
   grouping triplets of lines that share two lines; and
   grouping said fork junctions that share one line.

9. The method of claim 8, wherein said grouping of said fork junctions that share one line includes grouping said fork junctions only where said one line is a center line of at least one of said fork junctions.

10. A method of rectangular solid detection comprising:
    receiving an image of a scene;
    detecting edges from said image of said scene;
    finding lines from said edges and said image of said scene;
    finding triplets of lines from said lines and said image of said scene;
    finding fork junctions from said lines;
    filtering fork junctions and triplets of lines, wherein said filtering includes:
       accepting said triplets of lines with outer lines parallel and overlapping to produce an accepted set of triplet of lines;
       rejecting said fork junctions with angles greater 270°;
       rejecting said fork junctions with two obtuse angles and one angle acute; and
       accepting all remaining fork junctions to produce an accepted set of fork junctions;
    grouping said fork junctions and triplets of lines, wherein said grouping includes:
       grouping said accepted set of fork junctions and said accepted set of triplets of lines that share two lines;
       grouping said accepted set of triplets of lines that share two lines; and
       grouping identifying said accepted set of fork junctions that share one line; and
    determining whether a rectangular solid exists in said image when a grouping is formed.

* * * * *